United States Patent [19]

Mason et al.

[11] Patent Number: 5,565,227
[45] Date of Patent: Oct. 15, 1996

[54] BATTER-LIKE COATING AND METHOD OF MAKING

[75] Inventors: Charles R. Mason, Yonkers, N.Y.; Edward C. Coleman, New Fairfield, Conn.; Dalip K. Nayyar, Washingtonville, N.Y.

[73] Assignee: Kraft Foods, Inc., Northfield, Ill.

[21] Appl. No.: 357,566

[22] Filed: Dec. 16, 1994

Related U.S. Application Data

[63] Continuation of Ser. No. 21,150, Feb. 23, 1993, abandoned.

[51] Int. Cl.⁶ .............................. A23L 1/325; A23L 1/05
[52] U.S. Cl. ........................... 426/96; 426/92; 426/94; 426/289; 426/296; 426/549; 426/573; 426/652
[58] Field of Search .............................. 426/549, 296, 426/92, 94, 96, 652, 289, 573

[56] References Cited

U.S. PATENT DOCUMENTS

| | | | |
|---|---|---|---|
| 3,709,699 | 1/1973 | Hartman et al. | |
| 3,792,173 | 2/1974 | Glabe | 426/92 |
| 4,188,410 | 2/1980 | Rispoli et al. | 426/296 |
| 4,208,442 | 6/1980 | Evans et al. | 426/296 |
| 4,260,637 | 4/1981 | Rispoli et al. | 426/96 |
| 4,272,553 | 6/1981 | Bengtsson | 426/241 |
| 4,367,242 | 1/1983 | Jarvis et al. | 426/296 |
| 4,469,708 | 9/1984 | Rapp et al. | 426/293 |
| 4,496,601 | 1/1985 | Rispoli et al. | 426/554 |
| 4,511,583 | 4/1985 | Olson et al. | 426/296 |
| 4,588,600 | 5/1986 | Suderman | 426/555 |
| 4,640,837 | 2/1987 | Coleman et al. | 426/94 |
| 4,675,197 | 6/1987 | Banner et al. | 426/292 |
| 4,943,438 | 7/1990 | Rosenthal | 426/92 |
| 5,171,605 | 12/1992 | Attenburrow et al. | 426/656 |

FOREIGN PATENT DOCUMENTS

| | | |
|---|---|---|
| 34227 | 8/1981 | European Pat. Off. . |
| 109266 | 5/1984 | European Pat. Off. . |

OTHER PUBLICATIONS

Suderman, et al., Batter And Breading Technology, 1983, Ellis Horwood LTD, Chichester-GB, pp. 49–53.

*Primary Examiner*—Helen Pratt
*Attorney, Agent, or Firm*—Thomas R. Savoie; Thomas A. Marcoux

[57] ABSTRACT

A dry coating composition for imparting the texture, taste and appearance of batter fried foods to baked foodstuffs comprising 10 to 50% by weight binding agents, the binding agents containing egg white solids and gelatin, and 15 to 70% by weight bulking agents, the bulking agents containing pre-fried crumbs and/or cereal crumbs or fines. A well balanced proportion of egg white solids and gelatin provides a uniform, continuous, cohesive film that closely resembles the inner layer of a batter fried product and acts as a binder for the other coating ingredients to help retain moisture.

15 Claims, No Drawings

BATTER-LIKE COATING AND METHOD OF MAKING

This application is a continuation of application Ser. No. 08/021,150, filed Feb. 23, 1993, now abandoned.

FIELD OF THE INVENTION

This invention relates to edible food coatings and more particularly is directed to dry coating compositions which are to be applied to the food prior to baking and which produce a batter fried appearance, texture and taste to the oven baked food.

BACKGROUND OF THE INVENTION

Many foods such as seafood, meats and vegetables are prepared by first coating the food with a batter consisting essentially of flour, milk, eggs and seasoning. The batter coated food is then typically breaded with a light coating of flour and/or breadcrumbs and then fried by pan frying or deep fat frying. The fried batter coated food is enjoyed by consumers because the coating has a golden brown color and a soft crunchy texture that separates from the meat during eating resulting in a very tasty, greasy mouth feel. However, consumers also typically prefer the ease and simplicity of conventional baking as an alternative to frying. The messiness involved with the preparation of fried foods, the ever present danger of spattering oil, and the unfavorable dietary aspects associated with fried foods have led to the development of coatings which attempt to impart a fried appearance to foodstuffs which are baked and yet retain the appealing color, taste and texture associated with fried foods.

U.S. Pat. Nos. 4,496,601 to Rispoli et al. and 4,208,442 to Evans et al. disclose dry coating formulations which are useful to provide a fried appearance, taste and texture to baked comestibles. While each of these patents represents an advance in the art, they do not disclose a dry coating composition that imparts the appearance, texture and taste of batter fried comestibles to oven baked comestibles. Rispoli et al. discloses the use of a pre-fried batter component, which is flour-based being 10 to 50% by weight of the composition, a bread crumb component being from 17 to 35% of the composition, a starch component being from 10 to 30% of the composition and a film forming agent being from 1.5 to 30% of the composition. The film forming agent may be a protein such as gelatin or egg albumin.

Evans et al. discloses a dry coating composition having 60 to 78% of bulking agents which includes bread crumbs or cereal fines, a protein such as egg albumin or gelatin or other proteins, and flour. The composition also includes from 4 to 13% binding agents such as starch or dextrin. The Evans composition is made by first preparing a premix that includes all of the flour, a portion of the protein and a portion of the binding agents, mixing these ingredients, hydrating them and drying them. The premix makes up from 10 to 78% of the dry composition together with the remainder of the binding agents, protein and bulking agents. In the Evans et al. composition, it is critical that only a portion of the protein is included in the premix for the stated reason that if it is dry blended into their dry coating composition, an apparent gummy and powdery mouth feel as well as substantial reduction in uniformity and crispness occurs.

SUMMARY OF THE INVENTION

The present invention is directed to a unique dry coating composition for imparting the texture, taste and appearance of batter fried food to baked foodstuffs. The smooth and continuous appearance obtained from this dry coating system is particularly unique. The dry coating composition comprises 10 to 50% by weight binding agents, in which the binding agents are egg white solids and/or gelatin, and 15 to 70% by weight of bulking agents in which the bulking agents contain pre-fried crumbs and/or cereal crumbs or fines. The resulting composition may be applied to such foodstuff categories as fish, meat, including poultry, and vegetables prior to baking in order to impart the batter like texture, taste and appearance after cooking. Briefly stated, the instant invention is practiced by moistening the surface of the foodstuff then coating the moistened foodstuff with the dry coating composition of this invention and then baking the coated foodstuff in a conventional or microwave oven.

In a preferred embodiment of the invention, the bulking agents comprise pre-fried potato crumbs such as fine potato flakes, high density potato flakes, processed scalloped potatoes or potato chips. In addition, foam frying agents may also be added. The foam frying agents include powdered shortening ranging from 5 to 25% of the coating composition and lecithin ranging from 0.5 to 4% of the coating composition. The foam frying agents combined with moisture released from the meat during baking to initiate surface frying of the meat. In a further preferred embodiment of the invention, the coating composition also contain sugar in the range of 3 to 15% by weight of the dry coating composition. The sugar, such as fructose or sucrose, enhances crispness and browning during baking.

DETAILED DESCRIPTION OF THE INVENTION

The dry coating composition of the present invention is a batter-like dry composition that imparts the texture, taste and appearance of batter fried foods to baked foodstuffs. An essential element of the dry coating composition of the present invention is a dry film developed from a combination of powdered gelatin and egg white solids. The blend of gelatin and egg white solids is used as a component in the dry coating composition for comestibles such as fish, meats or vegetables. The dry coating composition comprises 10 to 50%, preferably 30 to 40%, by weight binding agents which include the egg white solids and gelatin, and 15 to 70%, preferably 40 to 60%, by weight bulking agents, such as pre-fried crumbs, and/or cereal crumbs or fines. The comestible is dampened and dipped in the dry composition and the powders become sticky and adhere easily to the surface of the comestible. The coated comestible is then placed in a pan and baked in a conventional or microwave oven. Unless otherwise indicated the weight percentages of the dry coating mix are based on an unflavored mix or a mix with the weight of flavoring ingredients (e.g., spices, salt, flavors, etc.) discounted.

The egg white solids and gelatin are preferably combined in a weight ratio of the egg white solids to the gelatin ranging from 1.0–10:1. The egg white solids range from 10 to 40% by weight of the dry coating composition and are preferably from 15 to 35% by weight of the dry coating composition. The gelatin ranges from 3 to 20% by weight of the dry coating composition and is preferably from 5 to 15% by weight of the dry coating composition.

The unique, well-balanced proportion of egg white solids and gelatin, once the meat has been baked, results in the development of a uniform continuous cohesive film that acts as a binder for the other coating ingredients. In addition, the cohesive film retains moisture in the comestibles and closely resembles the inner layer of a batter fried product. Performance is greatly enhanced by the addition of other ingredients such as the various crumb type materials which provide added texture and help simulate the outer surface of a batter fried product. Although the gelatin and egg white solids are both sticky materials when exposed to moisture, the egg white component adds strength to the film while the gelatin adds a softer, gummier mouth feel.

The gelatin facilitates formation of a continuous crisp, glassy film during baking. The gelatin absorbs moisture initially from the wet surface of the foodstuff and later from the moisture driven out during cooking. As the gelatin absorbs moisture it becomes gummy, forms a film, then dries and becomes crisp.

When exposed to the moisture released from the comestible during baking, the egg white solids and gelatin combination results in a uniform, continuous, cohesive film being developed that is unattainable by other well known dry, binder-type ingredients such as starches, gums and dextrins.

The bulking agents are comprised of pre-fried and/or denatured crumb components. The cereal crumbs or fines are preferably cornflake crumbs or fines and the pre-fried crumbs are preferably potato crumbs. Potato based materials are of particular interest because of the batter-like "crunch" imparted to the coating matrix after processing. Various sizes and shapes of dehydrated potato flakes, chips and scalloped potatoes are reprocessed into crumb-type materials to be used as the bulking agents of the dry coating composition of the invention. The pre-fried potato crumbs are preferably one or more of fine potato flakes, high density potato flakes, processed scalloped potatoes or potato chips. By fine potato flakes what is meant is an untapped (i.e., as received) bulk density of 0.28–0.30 gm/cc. By high density potato flakes what is meant is an untapped bulk density of at least 0.5 gm/cc. The crumbs are preferably flat chip-like crumbs which facilitate fusing together with the binding agents to form a continuous film around the fish, meat or vegetables during baking.

The pre-fried potato crumbs may be prepared by placing the potato materials in a tray in a monolayer, then partially hydrating the materials by spraying on water (20% by weight) with an atomizer. The potato materials are then fried in 375° F. vegetable oil, such as hydrogenated soybean oil, for times ranging from 45 seconds to 2 minutes depending on the required color and texture. Some processed potatoes (scallop and chip forms) require additional grinding and sieving steps after frying. To achieve the optimum fried appearance, a combination of fried potato materials are blended. In one preferred embodiment, a weight ratio of 0.5–2:1, preferably about 1:1, fine potato flakes and high density potato flakes provide excellent results.

An example of the process used for pre-frying the potato crumbs is as follows: 50 grams of potato samples were placed in a thin layer in a baking pan. Two samples were pre-fried, one being ground potato flakes and the second being high density potato flakes. 10 grams of water were applied onto each of the potato flake samples as a fine mist. The potatoes were then fried at 375° F. for 45 seconds then drained on a paper towel. An example of a process for making scalloped potato crumbs is as follows: dehydrated potato slices were soaked in water for 30 minutes. The slices were then drained and fried at 375° F. for 90 seconds and for 120 seconds. The slices were allowed to cool on paper towels then ground up in a blender for 5 to 10 seconds. The ground materials was sieved through a No. 6 U.S. Standard Sieve. Before use the material was reground and sieved using a No. 8 (U.S.S.) and a No. 14 (U.S.S.) sieve.

In addition, different flour systems may also be added to the dry coating composition. The flour may range from 5 to 15% by weight of the coating composition. The flour systems may include one or more of wheat, cake, pastry, rice or corn flour. The added flour provides textural characteristics to the batter-like dry coating composition.

In order to enhance the batter-like texture, taste and appearance to the baked comestible, foam frying agents may be added. U.S. Pat. No. 4,188,410 to Rispoli et al. discloses a method for frying comestibles in a frying medium that contains oil or fat and an emulsifier effective to foam the oil or fat during frying. In the present invention, the unique combination of foam frying agents in a dry coating composition results in a surface frying of the meat during oven baking. The foam frying agents include powdered shortening and/or lecithin. The powdered shortening and lecithin are preferably in a weight ratio of the shortening to the lecithin ranging from 2–40:1. It is preferred that, when used, the powdered shortening ranges from 5 to 25% by weight of the dry coating composition and the lecithin ranges from 0.5 to 4% weight of the dry coating composition. The foam frying of the surface of the fish or other meat during baking accelerates the removal of the surface moisture and enhances the film formation. The lecithin also improves the release of the product from the pan after baking.

The unique combination of a cohesive film forming component of egg white solids and gelatin, a pre-fried potato crumb component and a modified foam frying component of powdered shortening and lecithin results in a coating that upon baking closely resembles the texture, taste and appearance of batter-fried fish and other meats normally achieved with a wet batter application.

The unique dry coating composition of the present invention may be further enhanced by optionally including a sugar. For example, a reducing sugar, such as fructose, may be added in an amount ranging from 3 to 15% by weight of the dry coating composition. In a preferred embodiment, fructose is added in the range from 4 to 12% by weight of the dry coating composition. The added sugar, in combination with the high protein content of the dry coating composition, will improve the crispness of the coating. Fructose also provides better batter formation and enhanced browning. The addition of a well balanced amount of fructose produces a light brown color during baking and improved crispness that more closely simulates a batter-fried appearance.

In addition, residual flavor and color enhancing ingredients may also be added. The residual ingredients may include one or more of salt, spices, seasoning and color.

The dry coating composition of the present invention may be applied to such foodstuff categories as fish, meat, including poultry and vegetables. The dry composition, however, achieves especially good results when applied to fish. The dry coating composition of the present invention is applied to the fish or foodstuffs by first moistening the surface of the fish and then coating the moistened fish with the dry coating composition by any means common in the art. Such common means includes applying the coating composition to the moistened fish in a closed bag containing the composition, or simply covering the moistened fish with the coating composition. Baking may be done in a conventional oven or in a microwave oven. Generally, the temperature employed for baking coated fish in a conventional oven will be within the range of about 350° to 425° F. The foodstuffs coated with the dry coating composition of the present invention are cooked without the need for a flip step.

The dry batter coating of the present invention is a unique approach to frying in a conventional or microwave oven without the typical mess. The end result is a flavorful coated fish or meat or vegetable product that closely resembles batter fried. Preparation is convenient, easy and fast. In comparison, this product will contain less overall fat than typical deep fried fish, meat or vegetable. The dry coating composition of the present invention allows for the formation of a continuous batter like coating via a dry composition that may be applied conventionally such as in a poly bag. The utilization of high levels of egg white solids in combination with gelatin and with the addition of pre-processed bulking agents, provides the essential elements of the invention. The addition of powdered shortening and lecithin enhances the texture of the product, and the addition of a sugar, such as fructose, improves the taste and appearance of the baked foodstuffs.

The preferred methods of carrying out this invention are best given by way of the following examples which are, however, not to be regarded as limiting the scope of the invention. The percentages expressed in the examples are on a weight basis.

EXAMPLE I

A dry coating composition is prepared containing the following ingredients:

| INGREDIENT | % |
| --- | --- |
| Fine Fried Potato | 27.8 |
| Hi Density Fried Potato Flakes | 27.8 |
| Egg White Solids | 33.3 |
| 300 Bloom Gelatin | 11.1 |
| | 100.00 |

All the dry ingredients above are mixed and placed in a small poly shaker bag. A fish fillet is coated by placing the fillet in the bag then shaking until uniformly coated. The coated fish is placed on a shallow baking sheet and baked in a conventional oven at 400° F. for 14 minutes.

The result is a baked fish fillet that has the texture, appearance and taste of a batter fried fish fillet.

EXAMPLE II

A dry coating composition was prepared containing the following ingredients:

| INGREDIENT | % |
| --- | --- |
| Fine Fried Potato | 27.40 |
| Hi Density Fried Potato Flakes | 27.40 |
| Egg White Solids (Henningsen P-110)* | 19.17 |
| 300 Bloom Gelatin | 10.96 |
| Powdered Shortening (Kaorich Beads ™)** | 13.70 |
| Lecithin (Centrolex ™ D)*** | 1.37 |
| | 100.00 |

*Henningsen Foods, Omaha, Nebraska
**Van Der Bergh Foods Co., Lisle, Illinois
***Central Soya, Fort Wayne, Indiana Two flounder fillets were washed and left damp. All the dry ingredients above were mixed and the coating mix was placed in a small poly shaker bag. The fish fillets were coated one at a time by placing a fillet in the bag then shaking until uniformly coated. The coated fillets were placed in a shallow baking sheet and baked in a conventional oven at 400° F. for 12 minutes.

The result was two baked fish fillets that looked and tasted like batter fried. The fish had excellent texture and mouth feel characteristics.

EXAMPLE III

A dry coating composition was prepared containing the following ingredients:

| INGREDIENT | % |
| --- | --- |
| Processed Scallop Potatoes (−14, +16 U.S. mesh) | 45.66 |
| Egg White Solids (Henningsen P-110) | 27.40 |
| Powdered Shortening (Kaorich Beads ™) | 11.42 |
| 300 Bloom Gelatin | 9.13 |
| Fructose | 5.71 |
| Lecithin (Centrolex ™ D) | .68 |
| | 100.00 |

Two flounder fillets were coated the same as in Example II.

The result was two baked fish fillets that looked and tasted like batter fried. The crispy brown-colored coating had excellent texture and mouth feel characteristics as well as the appearance of batter fried fish.

EXAMPLE IV

A dry coating composition was prepared containing the following ingredients:

| INGREDIENT | % |
| --- | --- |
| Corn Flake Crumbs | 42.54 |
| Gelatin 300 Bloom | 3.63 |
| Lecithin (Centrolex ™ D) | 1.88 |
| Egg White Solids (Henningsen P-110) | 25.41 |
| Powdered Shortening (Kaorich Beads) | 19.98 |
| Caramel Color #175 | .23 |
| White Pepper GND. | .75 |
| Fine Grind Salt | 3.50 |
| Natural Lemon Flavor | 2.08 |
| | 100.00 |

Two flounder fillets were coated the same as in Example II.

The result was two baked fish fillets that looked and tasted like batter fried.

Having thus described the invention, what is claimed is:

1. A dry-blended coating composition for imparting the texture, taste and appearance of batter fried foods to baked foodstuffs comprising on an unflavored weight basis:

(a) 15 to 35% egg white solids and 3 to 20% gelatin with the ratio of egg white solids to gelatin being 1.0–10:1; and (b) 40 to 60% of bulking agents selected from the group consisting of pre-fried crumbs, cereal crumbs, cereal fines and combinations thereof.

2. The composition of claim 1 wherein binding agents contained in the composition consist essentially of egg white solids and gelatin.

3. The composition of claim 2 wherein the composition contains 30 to 40% binding agents.

4. The composition of claim 1 wherein gelatin is present at a level of from 5 to 15%.

5. The composition of claim 1 wherein the bulking agents include pre-fried potato crumbs.

6. The composition of claim 1 which further contains from 5 to 15% flour.

7. The composition of claim 1 which further contains from 5 to 25% powdered shortening and 0.5 to 4% lecithin.

8. The composition of claim 1 which further contains from 4 to 12% fructose.

9. A method of coating and cooking fish fillets to produce a batter-fried texture, taste and appearance comprising the step of:

(a) coating the surface of fish fillets with a dry-blended coating composition, said composition comprised of, on an unflavored weight basis, 15 to 35% egg white solids, 3 to 20% gelatin and 40 to 60% bulking agents selected from the group consisting of pre-fried crumbs, cereal crumbs, cereal fines and combinations thereof, wherein the weight ratio of egg white solids to gelatin in the coating composition is 1.0–10:1; and (b) baking the coated fish fillets at a temperature of about 350° to 425° F.

10. The method of claim 9 wherein the gelatin content is 5 to 15%.

11. The method of claim 9 wherein the composition contains pre-fried potato crumbs.

12. The method of claim 9 wherein the binding agents contained in the composition consist essentially of egg white solids and gelatin.

13. The method of claim 9 wherein the composition contains 30 to 40% binding agents.

14. The method of claim 9 wherein the composition further contains foam frying agents including powdered shortening and lecithin.

15. The method of claim 9 wherein the composition further includes 4 to 12% fructose.

* * * * *